(12) United States Patent
Miyauchi

(10) Patent No.: US 6,385,133 B1
(45) Date of Patent: May 7, 2002

(54) ELECTRONIC APPARATUS WITH AZIMUTH METER AND AZIMUTH MEASURING METHOD IN THIS ELECTRONIC APPARATUS

(75) Inventor: Norio Miyauchi, Tanashi (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/489,928

(22) Filed: Jan. 24, 2000

Related U.S. Application Data

(63) Continuation of application No. PCT/JP99/03295, filed on Jun. 21, 1999.

(30) Foreign Application Priority Data

| Jun. 22, 1998 | (JP) | 10-174374 |
|---|---|---|
| Aug. 27, 1998 | (JP) | 10-241337 |

(51) Int. Cl.[7] .................................................. G04B 47/00
(52) U.S. Cl. ........................... 368/10; 33/355 R; 33/334
(58) Field of Search ............................. 368/10; 33/333, 33/334, 355 R, 356, 357

(56) References Cited

U.S. PATENT DOCUMENTS

| 3,902,252 | A | * | 9/1975 | Farber | 33/356 |
|---|---|---|---|---|---|
| 4,365,197 | A | | 12/1982 | Pyatt et al. | |
| 4,376,535 | A | | 3/1983 | Muselet et al. | |
| 4,482,255 | A | * | 11/1984 | Gygax et al. | 368/10 |
| 4,668,100 | A | * | 5/1987 | Maurakami et al. | 368/10 |
| 5,095,630 | A | * | 3/1992 | Nomura et al. | 33/356 |
| 5,175,936 | A | * | 1/1993 | Sato | 368/10 |
| 5,216,816 | A | * | 6/1993 | Ida | 33/356 |
| 5,596,551 | A | * | 1/1997 | Born et al. | 368/10 |
| 5,697,162 | A | * | 12/1997 | Bornand et al. | 368/10 |
| 5,721,713 | A | * | 2/1998 | Bornand | 368/10 |
| 5,883,861 | A | * | 3/1999 | Moser et al. | 368/10 |
| 6,229,965 | B1 | * | 5/2001 | Ito et al. | 396/319 |

FOREIGN PATENT DOCUMENTS

| EP | 0 568 117 | 11/1993 | |
|---|---|---|---|
| JP | 358137786 A | * 8/1983 | 368/10 |
| JP | 59-137587 | 9/1984 | |
| JP | 61-48389 | 4/1986 | |
| JP | 6-69881 | 9/1994 | |
| JP | 10-170664 | 6/1998 | |

\* cited by examiner

*Primary Examiner*—Christopher W. Fulton
*Assistant Examiner*—Jeanne-Marguerite Goodwin
(74) *Attorney, Agent, or Firm*—Kanesaka & Takeuchi

(57) ABSTRACT

An electronic apparatus with an azimuth meter is capable of measuring an accurate azimuth and is made small even if one or a plurality of magnetized members for generating a magnetic field exists. Magnetic screen is provided for shielding an azimuth sensor from a magnetic field generated from a battery and a stepping motor. Moreover, when the stepping motor rests, an azimuth is measured, and rotor rest time and a direction of the magnetic field generated from a rotor are predicted based on rotor rotation starting time and a direction of a driving current flowing through a coil, and the measured azimuth is corrected according to the predicted result.

30 Claims, 11 Drawing Sheets

ELECTRONIC APPARATUS WITH AZIMUTH METER AND AZIMUTH MEASURING METHOD IN THIS ELECTRONIC APPARATUS

CROSS REFERENCE TO RELATED APPLICATION

This is a continuation application of PCT International Application of PCT/JP99/03295 filed on Jun. 21, 1999.

TECHNICAL FIELD

The present invention relates to an electronic apparatus with an azimuth meter having an azimuth sensor for electrically detecting the earth magnetism and a battery for driving respective drive units, which is capable of measuring an accurate azimuth and capable of being miniaturized, and relates to an azimuth measuring method in the electronic apparatus.

BACKGROUND ART

In recent years, there are some electronic apparatuses which are capable of measuring an azimuth easily. As one example of such the electronic apparatuses, an overall view of a digital electronic wrist watch with the azimuth meter which is on a market is shown in FIG. 12.

The digital electronic wrist watch 130 with an azimuth meter includes an azimuth measuring button 132 which is operated when an azimuth is measured, a liquid crystal display panel 131 having a magnetic north mark 134 for indicating the magnetic north and a 16 compass points display section 135 for displaying an azimuth of the 16 compass points which matches with a twelve o'clock direction of the electronic wrist watch 130, an azimuth sensor 133 for electrically measuring an azimuth from the earth magnetism, and an azimuth register ring 136 which can be rotated with respect to the liquid crystal display panel 131.

When the azimuth measuring button 132 is pushed, the magnetic north is measured by the azimuth sensor 133, and the magnetic north is indicated on the liquid crystal display panel 131 by the magnetic north mark 134 in about one second. Moreover, the direction of the twelve o'clock of the electronic wrist watch 130 (NNE in FIG. 12) is displayed on the 16 compass points display section 135. When the azimuth register ring 136 is rotated and the N (north azimuth) 136a is matched with the magnetic north mark 134, an azimuth can be grasped at will.

However, in the electronic apparatus with the azimuth meter having a battery and one or a plurality of drive units driven by the battery, a magnetic field generated from the battery and a driver such as a stepping motor disturbs the earth magnetism around the azimuth sensor, and thus it is difficult to measure the accurate azimuth.

In order to solve such a problem, the devised position for providing position of the battery is suggested, but the position of the battery is limited. Also since the battery is separated from the azimuth sensor as far as possible, a circuit substrate becomes larger. As a result, the electronic apparatus cannot be miniaturized.

Further, since a rotor made of a permanent magnet of the driver such as the stepping motor is rotated, a magnetic field changes complicatedly, and when a plurality of the stepping motors are provided, the magnetic field becomes more complicated so that the correction becomes difficult. As a result, an accurate azimuth cannot be measured. When indication of an azimuth is displayed on a liquid crystal display shown in FIG. 12, it is not necessary to provide a stepping motor for moving an azimuth needle. However, it is difficult to see the liquid crystal display due to a problem of a view angle.

It is an object of the present invention to provide an electronic apparatus with the azimuth meter having an azimuth sensor for electrically detecting the earth magnetism which is capable of measuring an accurate azimuth even if one or a plurality of magnetized member(s) for generating a magnetic field exist(s), and which is easy-to-watch and can be miniaturized by relieving a limit of a providing position of the magnetized member for generating strong magnetism such as a magnetized battery and stepping motor, and to provide an azimuth measuring method in the electronic apparatus with the azimuth meter.

DISCLOSURE OF THE INVENTION

In an electronic apparatus with an azimuth meter according to the present invention having an azimuth sensor for electrically detecting the earth magnetism, a magnetic screen for blocking off the azimuth sensor from a magnetic field is provided around a magnetized member provided in the electronic apparatus with an azimuth meter or between the magnetized member and the azimuth sensor, so that an accurate azimuth can be measured.

"The magnetized member" is a member which is easily magnetized by external magnetism as well as a member magnetized by external magnetism and a member having a magnet, and it includes a driver such as a motor having a battery and a magnet.

In addition, a limit of the providing position of the magnetized member can be relieved, and the electronic apparatus with an azimuth meter which is provided with an azimuth needle and is easily seen can be obtained.

In addition, an electronic apparatus with an azimuth meter according to the present invention, which includes an azimuth sensor for electrically detecting the earth magnetism and a driver having a rotor composed of a permanent magnet and a coil for driving the rotor, is provided with an azimuth sensor for measuring an azimuth when the driver rests, time detecting means for detecting the rotation starting time of the rotor, rotor magnetic field predicting means for predicting rest time of the rotor and an azimuth of a magnetic field generated from the rotor from a rotating starting signal detected by the time detecting means and a direction of a driving current flowing through the coil, and correcting means for correcting the measured azimuth according to the predicted result.

As a result, the correction can be made according to a change in a magnetic pole with the rotation of the rotor, and thus an accurate azimuth measured azimuth can be always obtained.

Further, in an azimuth measuring method of an electronic apparatus with an azimuth meter according to the present invention, the electronic apparatus including an azimuth sensor for electrically detecting the earth magnetism, a battery for driving respective drive units and a driver positioned in the drive units having a rotor made of a permanent magnet and a coil for driving the rotor, the azimuth measuring method, includes the steps of: measuring an azimuth by driving the azimuth sensor when the driver rests; predicting rest time of the rotor and a direction of a magnetic field generated from the rotor based on rotation starting time of the rotor and a direction of a driving current flowing through the coil; and correcting the measured azimuth according to the predicted result. As a result, the correction can be made according to a change of the magnetic pole with the rotation of the rotor, and an accurate azimuth measured azimuth can be always obtained.

In addition, an electronic apparatus with an azimuth meter according to the present invention, which has an azimuth sensor for electrically detecting the earth magnetism and a driver having a rotor composed of a permanent magnet and a coil for driving the rotor, is provided with the azimuth sensor measuring an azimuth when the driver rests; time detecting means for detecting rotation starting time of the rotor; predicting means for predicting rest time of the rotor from a rotation starting signal detected by the time detecting means; and correcting means for correcting the measured azimuth. As a result, an accurate azimuth measured azimuth can be always obtained.

Further, in an azimuth measuring method of an electronic apparatus with an azimuth meter according to the present invention, the electronic apparatus including an azimuth sensor for electrically detecting the earth magnetism, a battery for driving respective drive units and a driver positioned in the drive units having a rotor made of a permanent magnet and a coil for driving the rotor, the azimuth measuring method, includes the steps of: measuring an azimuth by driving the azimuth sensor when the driver rests; predicting rest time of the rotor based on rotation starting time of the rotor; and correcting the measured azimuth. As a result, an accurate azimuth measured azimuth can be always obtained.

In addition, an electronic watch with an azimuth meter according to the present invention, which has an azimuth sensor for electrically detecting the earth magnetism and a driver having a rotor composed of a permanent magnet and a coil for driving the rotor, is provided with the azimuth sensor measuring an azimuth when the driver tests; means for returning a time hand or a function hand driven by the driver to a predetermined position; and correcting means for correcting the measured azimuth. As a result, an accurate azimuth measured azimuth can be always obtained.

Further, in an azimuth measuring method of an electronic watch with an azimuth meter according to the present invention, the electronic apparatus including an azimuth sensor for electrically detecting the earth magnetism, a battery for driving respective drive units and a driver positioned in the drive units having a rotor made of a permanent magnet and a coil for driving the rotor, means for returning a time hand or function hand driven by the driver to a predetermined position is provided, and an azimuth is measured by driving the azimuth sensor when the driver rests so that the measured azimuth is corrected. As a result, an accurate azimuth measured azimuth can be always obtained.

BRIEF DESCRIPTION OF THE DRAWINGS

FIGS. 1(a) and 1(b) show an electronic wrist watch with an azimuth meter according to a first embodiment of the present invention, wherein FIG. 1(a) is a plan view and FIG. 1(b) is a sectional view taken along line 1(b)—1(b).

FIGS. 2(a) and 2(b) show a second embodiment of the present invention, wherein FIG. 2(a) is a plan view of an analog electronic wrist watch with an azimuth meter and FIG. 2(b) is a sectional view taken along line 2(b)—2(b) of FIG. 1(a).

BEST MODE FOR CARRYING OUT THE INVENTION

Preferred embodiments of the present invention will be detailed below with reference to the drawings. Here; in the following description, an electronic wrist watch with an azimuth meter is exemplified as an electronic apparatus with the azimuth meter.

The First Embodiment

Figure 1A:
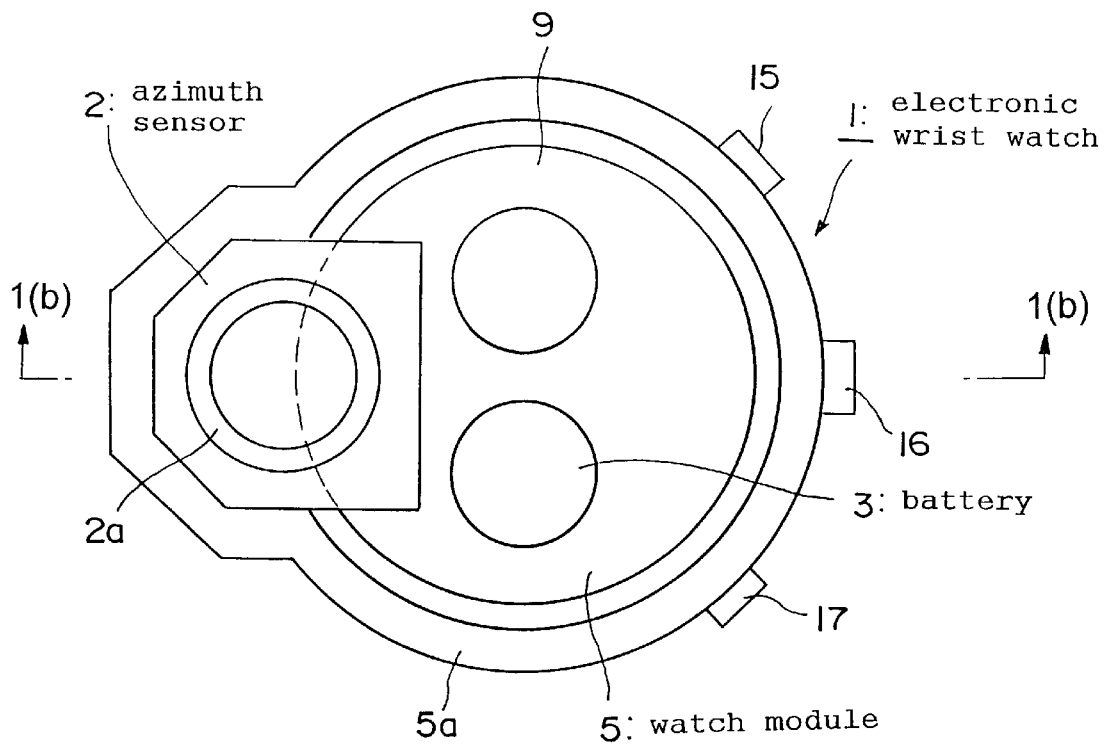
Figure 1B:
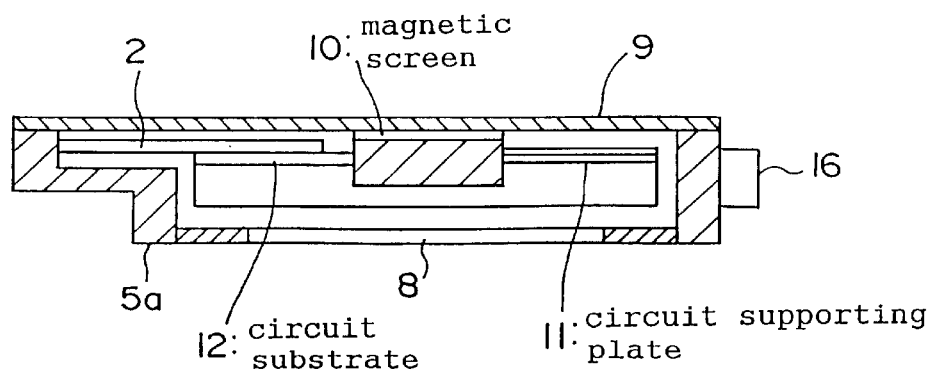

FIGS. 1(a) and 1(b) show an electronic wrist watch with an azimuth meter according to the first embodiment of the present invention, wherein FIG. 1(a) is a plan view that the electronic wrist watch with the azimuth meter is viewed from its rear side, and FIG. 1(b) is a sectional view taken along line 1(b)—1(b) of FIG. 1(a).

As is clear from FIGS. 1(a) and 1(b), the electronic wrist watch 1 with the azimuth meter in this embodiment includes a watch module 5 having an azimuth sensor 2, a button type battery 3, a watch case 5a for storing the watch module 5 therein, a windshield 8 fitted into the watch case 5a, a back 9 which is mounted to the rear surface of the watch case 5a and is opened and closed when the battery 3 is replaced, and buttons 15, 16 and 17 which are operated when an azimuth is measured and the like.

The azimuth sensor 2 for electrically detecting the earth magnetism is well known, and it is, for example, a thin flux gate type magnetic sensor which is disclosed in Japanese Patent Application Laid-Open No. Hei 9-43322 as "Feeble Magnetic Sensor and Manufacturing Method thereof".

In order to suppress an influence of a magnetic field generated by the magnetized battery 3 on azimuth measurement of the azimuth sensor 2, a magnetic screen 10 for blocking off magnetism is provided around the battery 3. The magnetic screen 10 will be described below.

Since the watch on the side of the back 9 is influenced by an external magnetic field from a short distance, it is preferable to mount the magnetic screen 10 to the back 9 using adhesive so as to surround the battery 3. The battery 3 is preferably a button type, and it is more preferable to provide the magnetic screen 10 in contact with both upper and lower surfaces of the battery 3. In the case where the magnetic screen 10 is mounted to the back 9, when the back 9 is removed upon an exchange of the battery, the magnetic screen 10 is simultaneously removed from the circumference of the battery 3. As a result, there is an advantage that the magnetic screen 10 does not disturb the exchange of the battery.

It is preferable that the magnetic screen 10 is made of a material with high magnetic permeability such as PC permalloy. The PC permalloy has very small coercive force of $10^{-2}$ Oe order, and the magnetized amplitude of the PC permalloy is very small and its magnetic permeability is high. For this reason, the battery 3 can be prevented from being magnetized by the external magnetic field. Moreover, even if the battery 3 is magnetized, a magnetic field generated therefrom is blocked off, and thus an influence which is exerted on the earth magnetism in the vicinity of the azimuth sensor 2 is made to be weak. Therefore, as shown in FIG. 1(a), even if the battery 3 is provided close to the azimuth sensor 2, the azimuth measurement by the azimuth sensor 2 is not disturbed.

As mentioned above, since the battery 3 can be provided in an arbitrary position on a circuit substrate 12, the circuit substrate 12 can be miniaturized, and the watch module can be also miniaturized.

The present invention is not limited to an analog type electronic apparatus, but it can be applied also to a digital type electronic apparatus.

The Second Embodiment

Figure 2A:
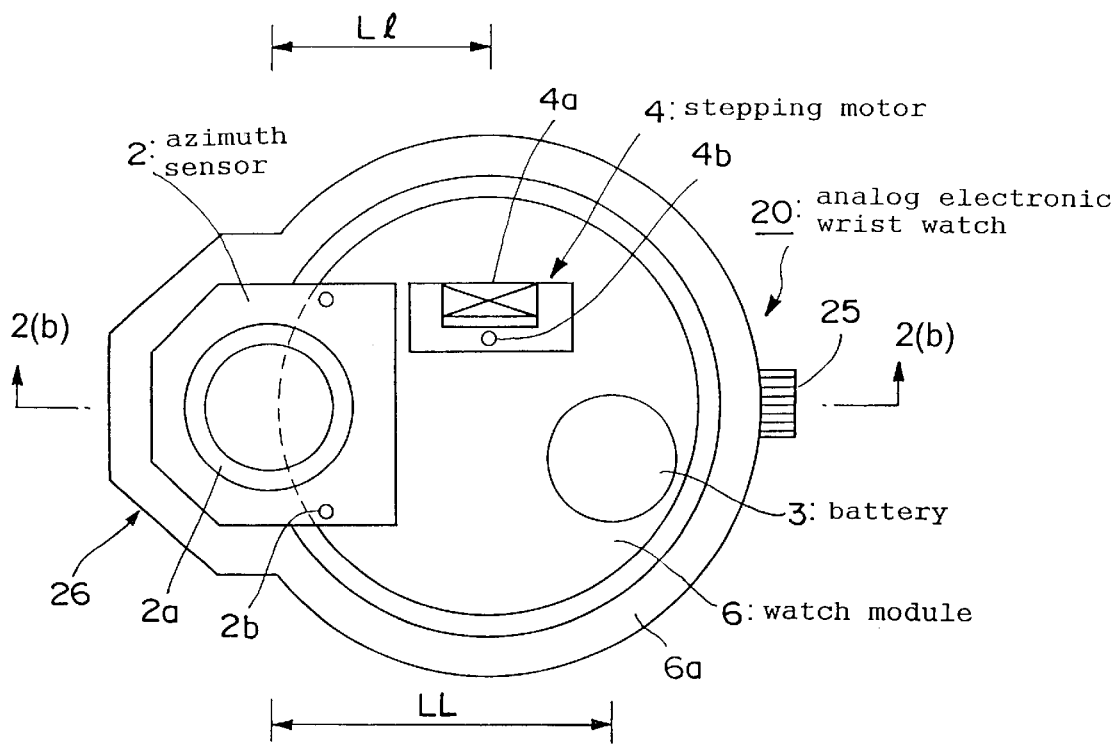
Figure 2B:
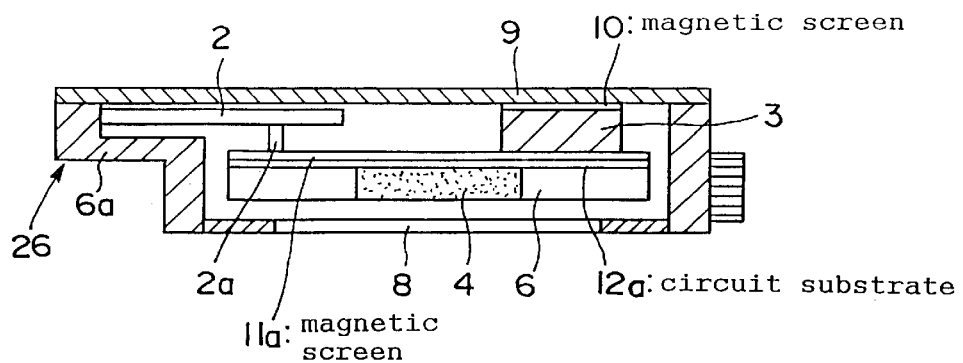

FIGS. 2(a) and 2(b) show a second embodiment of the present invention, wherein FIG. 2(a) is a plan view that an analog electronic wrist watch with the azimuth meter is viewed from its rear side, and FIG. 2(b) is a sectional view taken along line 2(b)—2(b) in FIG. 2(a).

As shown in FIGS. 2(a) and 2(b), the analog electronic wrist watch 20 with the azimuth meter includes the azimuth sensor 2 as an azimuth meter, a stepping motor 4 which comprises a coil 4a and a rotor 4b which is connected to train wheel handling needles (not shown) and is rotatable, a watch module 6 having a button type battery 3, a watch case 6a for storing the watch module 6 therein, a windshield 8 which is fitted onto the surface of the watch case 6a, a back 9 which is mounted detachably to the rear surface of the watch case 6a and is removed from the watch case 6a when the button type battery 3 is exchanged, and a crown 25 for setting time and the like.

The azimuth sensor 2 is provided so as to be separated from the battery 3 as far as possible. Namely, it is preferable to provide the azimuth sensor 2 so that a distance LL between a center of a magnetic core 2a of the azimuth sensor 2 and a center of the battery 3 becomes longer than a distance L1 between the center of the magnetic core 2a and a center of the rotor 4b of the stepping motor 4.

A projected section 26 is formed in the watch case 6a in a opposite side of the battery storage portion for storing the battery 3 therein, and the azimuth sensor 2 is located inside the projected section 26 by a locating pin 2b so as to be fixed therein.

Besides the normal stepping motor 4 for handling a needle, one or a plurality of stepping motor(s) for driving additional functions such as a stop watch is (are) occasionally provided in the watch case 6a. Also in this case, the azimuth sensor 2 is provided so as to be separated from the battery 3 as far as possible. The azimuth sensor 2 is provided so as to be separated from at least one of the stepping motor 4 for handling needles and the stepping motor for the additional functions, preferably both the stepping motors.

For example, when the analog electronic wrist watch 20 with the azimuth meter has the three stepping motors, experiments were made under the condition that a relationship of a distance between the azimuth sensor 2 and the stepping motor and the battery 3 was varied. As a result, when the distance LL was 22.5 mm and the distance L1 between the azimuth sensor 2 and the stepping motor which was the closest to the azimuth sensor 2 was 8.7 mm, the most suitable result was obtained.

The battery 3 is separated from the azimuth sensor 2 farther than the stepping motor 3 because when the electronic wrist watch 20 is exposed to an external magnetic field (normally, about 30 G, the earth magnetism is about 0.3 G), the battery 3 which is made of a soft magnetic material with stronger coercive force is magnetized more easily than the stepping motor, and the influence of the magnetic field generated from the magnetized battery 3 which is exerted on the azimuth sensor 2 is greater than the influence of the magnetic field generated from the stepping motor.

In addition, as the battery 3, a button type battery is more preferable than a coin type battery. The button type battery can avoid the approach of the stepping motor and the azimuth sensor in a plane, and thus can prevent the azimuth measurement from becoming impossible.

As mentioned above, the impossibility of the azimuth measurement due to the magnetization of the battery 3 and the stepping motor 4 can be avoided. In addition, when the magnetic screen is provided, the influence of the magnetic field generated from the rotor 4b of the stepping motor 4 made of a permanent magnet and from the magnetized battery 3 can be further suppressed. The electronic wrist watch 20 in this embodiment includes a magnetic screen 11a for suppressing the influence of the magnetic field from the rotor 4b of the stepping motor 4 as well as the magnetic screen 10 of the first embodiment.

As shown in FIGS. 2(a) and 2b), the magnetic screen 11a is provided between the stepping motor 4 and the azimuth sensor 2, and supports a circuit substrate 12a of the watch module 6. The magnetic screen 11a prevents the stepping motor 4 from being magnetized due to the external magnetic field, and shields the azimuth sensor 2 from the magnetic field of the magnetized stepping motor 4 and the magnetized rotor 4b so that the magnetic field does not influence the azimuth sensor 2. It is preferable that the magnetic screen 11a is made of a material whose magnetic permeability is lower than that of the magnetic screen 10 provided for the battery 3, such as an austenite stainless material so that the magnetic screen 11a do not extract a magnetic flux of the rotor 4b of the stepping motor 4 strongly and thus the driving of the stepping motor 4 is not disturbed.

The Third Embodiment

A third embodiment of the electronic wrist watch will be described below.

In the first and second embodiments, the object of the present invention that the azimuth is measured accurately by the azimuth sensor 2 is achieved by mechanical means, such as providing the magnetic screens 10 and 11a and modifying the positions of the stepping motor 4 and the battery 3. In this embodiment, the azimuth is measured accurately by electrical correction.

Figure 3:
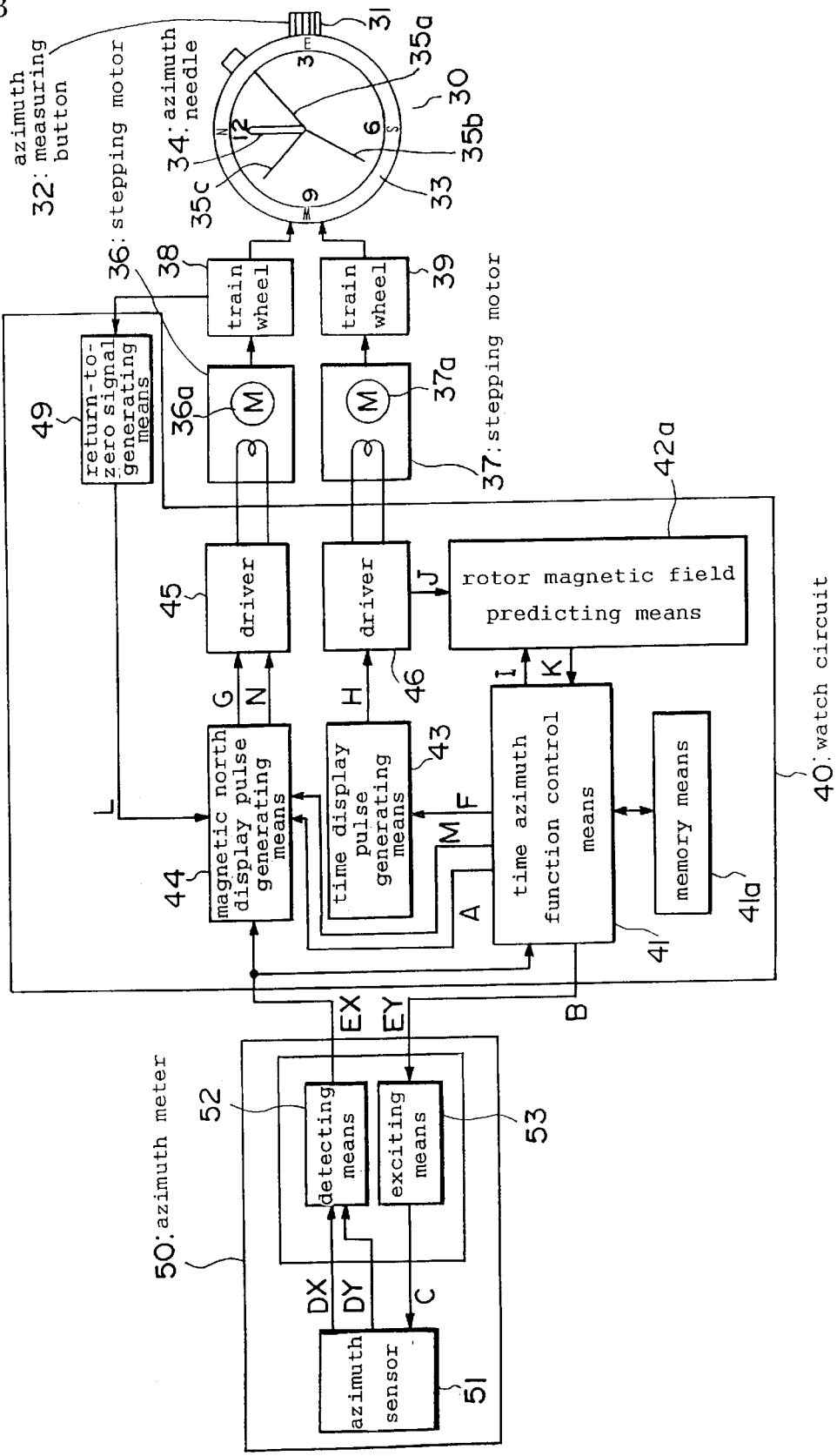
FIG. 3 is a block diagram of an electronic wrist watch according to a third embodiment of the present invention.

FIG. 3 is a block diagram of an electronic wrist watch according to the third embodiment of the present invention.

As shown in FIG. 3, an analog electronic wrist watch 30 with the azimuth meter includes the azimuth meter 50, a watch circuit (electronic circuit) 40, a stepping motor 37 for displaying time, watch hands having a second hand 35a, a minute hand 35b and an hour hand 35c, and which are driven by the stepping motor 37 via a train wheel 39, a stepping motor 36 for displaying the magnetic north, an azimuth needle 34 which is driven by the stepping motor 36 via a train wheel 38, an azimuth measuring button 32 which is operated when the azimuth is measured, and an azimuth register ring 33.

Figure 10:
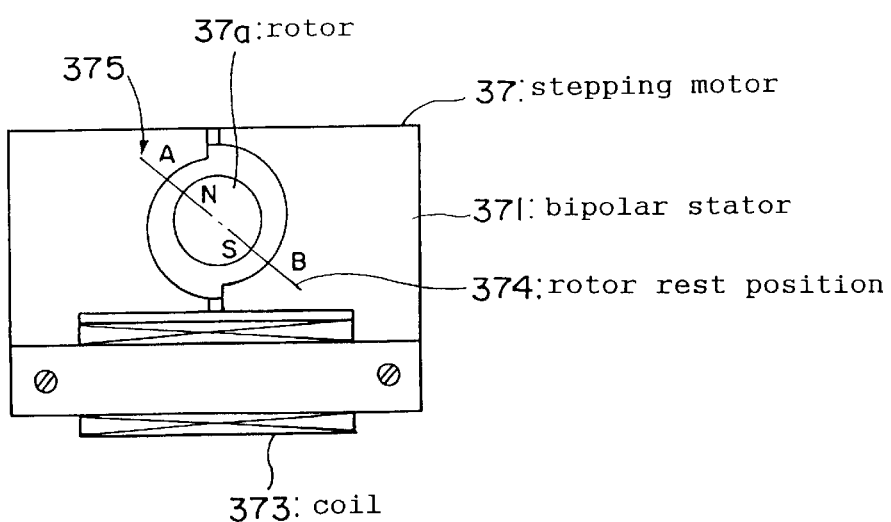
FIG. 10 is an explanatory diagram of a structure of a stepping motor.

As shown in FIG. 10, the stepping motor 37 is a plane-shaped stepping motor having a rotor 37a composed of a bipolar permanent magnet, a bipolar stator 371 provided around the rotor 37a, a coil 373 provided on the stator 371. The stepping motor 37 is generally called (Lavet type) stepping motor.

The rotor 37a has two rotor stop positions 374 and 375. When a direction of a pulse current flowing through the coil 373 is changed so that a direction of a magnetic field generated from the coil 373 is changed, the rotor 37a is accordingly inverted, and stops with the N pole is pointed to the stop position 374 or 375. Here, the same constitution is applicable to the stepping motor 36.

The azimuth meter 50 comprises an azimuth sensor 51, exciting means 53 for exciting the azimuth sensor 51, and detecting means 52 for outputting azimuth data EX and EY based on azimuth outputs DX and DY outputted by the azimuth sensor 51.

The watch circuit 40 includes a driver 46 for driving the stepping motor 37 for displaying time, time display pulse generating means 43 for outputting a time display pulse H to the driver 46 time azimuth function control means 41 for transmitting a signal F to the time display pulse generating means 43 and making the time display pulse generating means 43 output a pulse H to the driver 46, magnetic north display pulse generating means 44 for generating a magnetic north display pulse N for displaying the magnetic north based on the detected result of the azimuth sensor 51, and return-to-zero signal generating means 49, connected with the train wheel 38, for checking return-to-zero of the azimuth needle 34 and outputting a return-to-zero signal L.

The magnetic north display pulse generating means 44 outputs a magnetic north pulse N to the driver 45 based on a signal M from the time azimuth function control means 41 and the azimuth data EX and EY outputted by the detecting means 52 of the azimuth meter 50. Moreover, a return-to-zero signal L is inputted from the return-to-zero signal generating means 49 to the magnetic north display pulse generating means 44.

In addition, the driver 46, which has time detecting means for detecting the rotation starting time, outputs a signal J representing the rotation starting time of the rotor 37a and a direction of a driving current to rotor magnetic field predicting means 42a based on a signal I from the time azimuth function control means 41. The rotor magnetic field predicting means 42a predicts rest time and rest position of the rotor 37a based on the signal J. Furthermore, offset values X and Y which are composed of offset values X1 and Y1 due to a rotor leakage magnetic field and peculiar offset values X2 and Y2 owned by the azimuth sensor 51, and a sensitivity ratio (X/Y) which is a ratio of sensitivity Y and Y of the azimuth sensor 51 are stored in memory means 41a.

The rotor 37a of the stepping motor 37 for displaying time has two rest positions 374 and 375, and the rotor 36a of the stepping motor 36 for displaying the magnetic north has one rest position at the time of return-to-zero. As a result, two combinations of the magnetic poles exist. For this reason, two combinations of the offset values X and Y and the sensitivity ratio (X/Y) are prepared according to two combinations of the magnetic poles of the stepping motors 36 and 37.

Here, the offset values X and Y and the sensitivity ratio (X/Y) are stored in the memory means 41a previously when the electronic wrist watch is manufactured.

Figure 11:
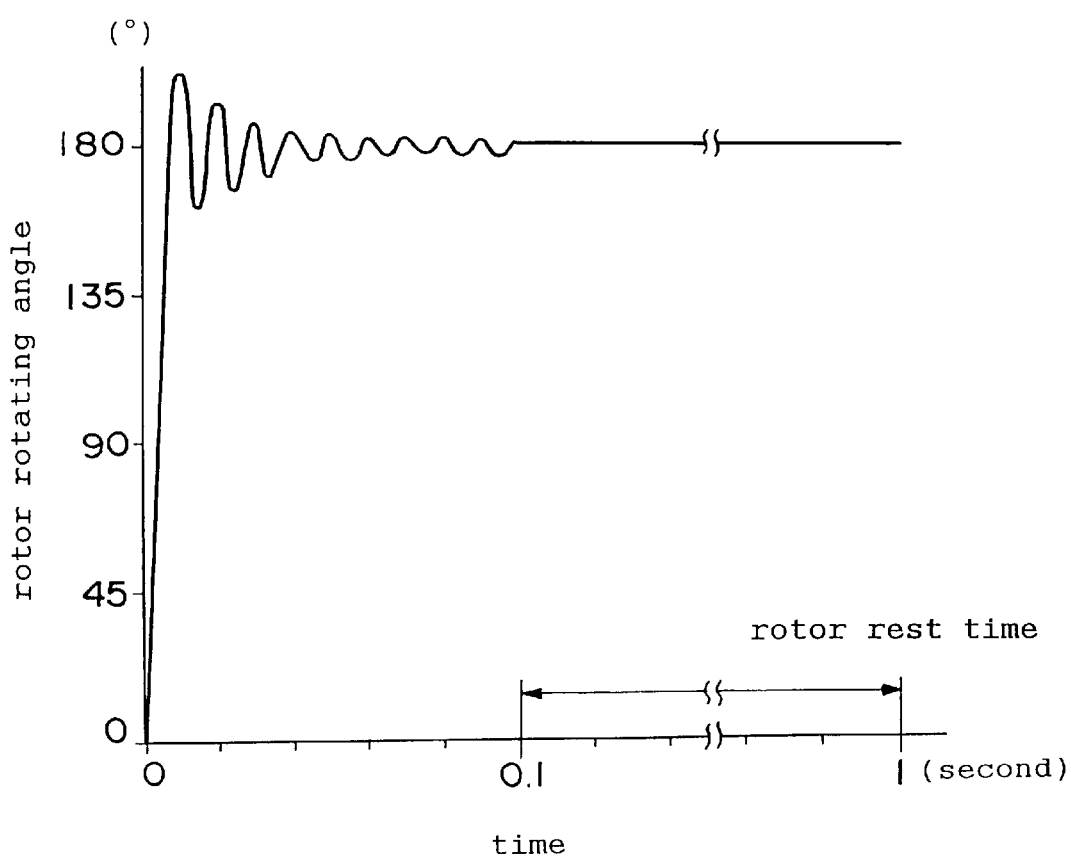
FIG. 11 is a graph showing a change in a rotor rotating angle with time after a pulse current is flowed.
Figure 12:
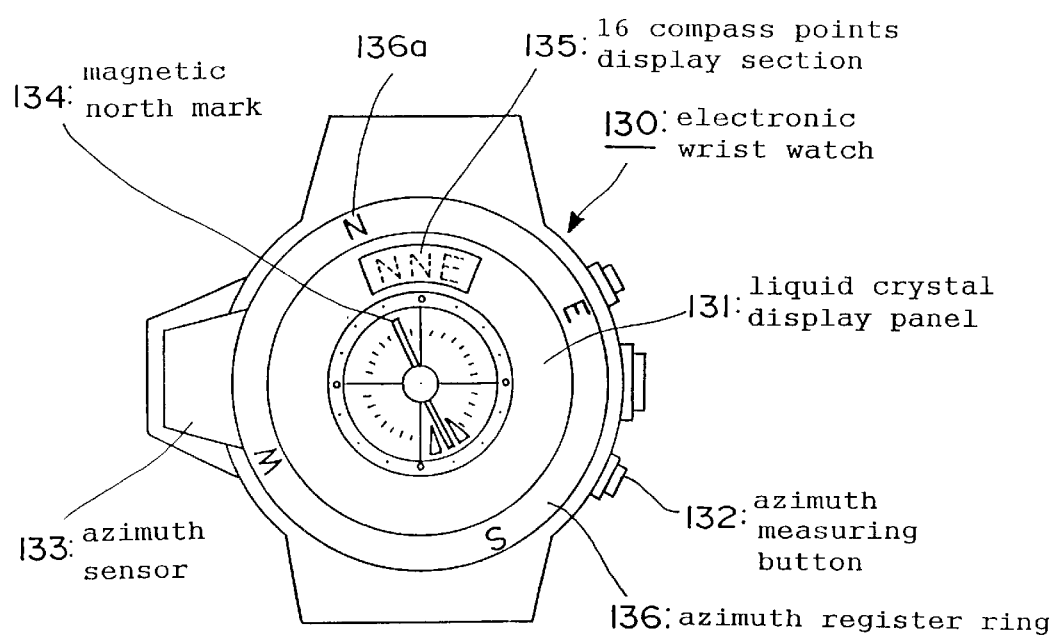
FIG. 12 is a diagram showing an overall view of a digital electronic wrist watch with an azimuth meter as one example of an electronic apparatus.

FIG. 11 is a graph showing a change in the rotor rotating angle with time after the pulse current is flowed. It requires certain time that the rotor 37a starts to rotate from the state that the N pole is in the rotor stop position 374, for example, and rotates through 180° and the N pole reaches the rotor stop position 375 and rests stably. In the electronic wrist watch, the pulse current is flowed per 1 second, and the rotor 37a rotates through 180° per 1 second. In the example shown in the graph of FIG. 11, it takes about 0.1 second that the rotor 37a starts to rotate and rests stably.

Since a magnetic pole direction of the permanent magnet of the rotor 37a is changed according to the rotation of the rotor 37a, the leakage magnetic field which disturbs the earth magnetism around the azimuth sensor 51 is also changed according to the rotation of the rotor 37a. This leakage magnetic field becomes stable when the rotor 37a rests completely.

Therefore, when an azimuth is measured by the azimuth sensor 51 in the state that the rotor 37a rests stably, correction can be made by using two sets of correction values in the state where the N pole faces the rotor stop position 374 and in the state where the N pole faces the rotor stop position 375.

This will be described concretely.

When the rotor 37a rests stably in a state that correction is not made, the azimuth data of the azimuth sensor 51 are assumed as EX and EY. Values of the azimuth data EX and EY in the magnetic field of zero are determined as offset values X and Y. The offset values X and Y include offset values X1 and Y1 obtained from the rotor leakage magnetism and peculiar offset values X2 and Y2 owned by the azimuth sensor 51.

The offset values X and Y are constant in the state that the N pole of the rotor 37a faces the rotor stop position 374 and rests stably. Moreover, the offset values X and Y are constant even in the state that the rotor 37a is inverted and the N pole faces the rotor stop position 375 and rests stably. Therefore, the sensitivity ratio (X/Y) is also constant in the state that the rotor 37a rests stably.

Accordingly, when the offset values X and Y are subtracted from the azimuth data EX and EY of the azimuth sensor 51 and the sensitivity ratio (X/Y) is corrected, the shift due to the influence of the rotor leakage magnetic field on the earth magnetism and a peculiar shift of the azimuth sensor 51 can be corrected.

A calculating method of the offset values X and Y will be described below.

At first, the stepping motor 36 for displaying the magnetic north is driven based on a signal A from the time azimuth function control means, and the azimuth needle 34 is returned to zero. The rotor 36a of the stepping motor 36 for displaying the magnetic north rests in a position where the azimuth needle 34 returns to zero.

Next, a rest position of the rotor 37a of the stepping motor 37 for displaying time is predicted based on the signal J outputted from the driver 46.

At this time, while magnetic fields corresponding to the earth magnetism are applied to X, -X, Y and -Y axial directions of the azimuth sensor 51 by using an earth magnetism simulation apparatus, not shown, the azimuth meter 50 is driven by the signal B from the time azimuth function control means 41. The azimuth data EX and EY are inputted from the azimuth meter 50 to the time azimuth function control means 41. The offset values X and Y are obtained from the azimuth data EX and EY according to the following equations.

$$\text{Offset value } X = (EX(X) + EX(-X))/2 \quad \text{(equation 1)}$$

$$\text{Offset value } Y = (EY(Y) + EY(-Y))/2 \quad \text{(equation 2)}$$

Here, EX(X) is azimuth data at the time of applying a magnetic field to the X axis, and EX(−X) is azimuth data at the time of applying the magnetic field to the −X axis, and EY(Y) is azimuth data at the time of applying a magnetic field to the Y axis, and EY(−Y) is azimuth data at the time of applying a magnetic field to the −Y axis.

A method of obtaining the sensitivity ratio (X/Y) will be described below.

The azimuth data EX and EY are corrected according to the following equations, and the sensitivity ratio (X/Y) is obtained from the corrected azimuth data EX and EY.

At first, the sensitivity ratio (X/Y) is obtained in the state that the N pole of the rotor 37a faces the rotor stop position 374 and the rotor 37a rests stably.

$$EX(X) = EX(X) - \text{offset value } X \quad \text{(equation 3)}$$

$$EY(X) = EX(X) - \text{offset value } Y \quad \text{(equation 4)}$$

Sensitivity ratio (XY)=EX(X)/EY(Y)

Here, in the equations 3 and 4, the results of subtracting the offset values X and Y from EX(X) and EY(Y) are defined as EX(X) and EY(Y).

Next, the stepping motor 37 for displaying time is driven based on the signal F, and the rotor 37a is inverted. The rotor magnetic field predicting means 42a predicts a rest position of the rotor 37a from the signal J outputted from the driver 46, and outputs the signal K to the time azimuth function control means 41. The offset values X and Y and the sensitivity ratio (X/Y) are obtained in the same manner as the above in the predicted rest position.

Two sets of the offset values X and Y and the sensitivity ratios (X/Y), which correspond to the combinations of the rest positions 374 and 375 of the rotor 37a of the stepping motor 37 for displaying time obtained in each of the rotor stop positions 374 and 375 and the rest position of the rotor 36a of the stepping motor 36 for displaying the magnetic north at the time of return-to-zero, are stored in the memory means 41a by the time azimuth function control means 41.

In the present embodiment, since there are one rotor rest position for the rotor 36a of the stepping motor 36 for displaying the magnetic north and two rotor rest positions (374, 375) for the rotor 37a of the stepping motor 37 for displaying time, the total number of combinations of the magnetic poles are two. Therefore, averages of the offset values and the sensitivity ratios are obtained according to a number of combinations of the magnetic poles (in the present embodiment, two), and the averages are used for the correction. In this case, an average of the measured azimuths in these combinations is corrected.

As a result, in the case where a plurality of stepping motors exist, for example, it is not necessary to detect or predict as to directions that the magnetic poles of the stepping motors face, and the measured azimuths can be corrected by using single or small number of correcting values. For this reason, the above method is advantageous.

Figure 4:
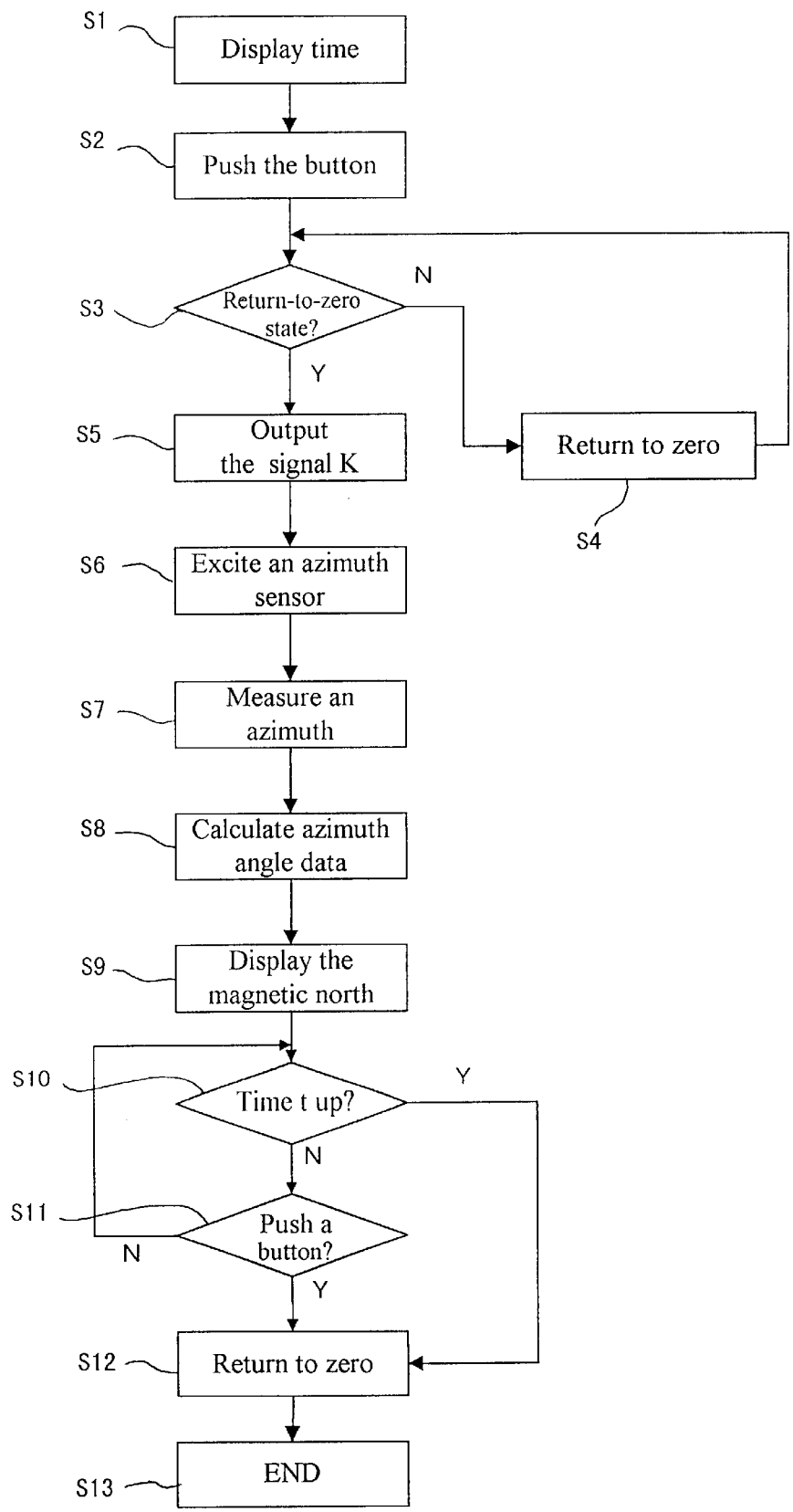
FIG. 4 is a flow chart of an azimuth measurement display for explaining an azimuth measurement display method in the electronic wrist watch according the embodiment of FIG. 3.

A display method of azimuth measurement in the electronic wrist watch will be described below according to the embodiment of FIG. 3 by using the flow chart of the azimuth measurement display in FIG. 4.

At first, when the azimuth measuring button 32 is pushed (step 2) in the state that time is displayed (step 1) in the analog electronic wrist watch 30 with the azimuth meter, an azimuth is started to be measured.

The time azimuth function control means 41 outputs an azimuth needle return-to-zero acknowledge signal A to the magnetic north display pulse generating means 44. The return-to-zero signal generating means 49 outputs a return-to-zero signal L via the train wheel 38 to which the azimuth needle 34 is mounted.

The magnetic north display pulse generating means 44 confirms as to whether or not the return-to-zero signal L outputted from the return-to-zero signal generating means 49 corresponds to return-to-zero of the azimuth needle 34 (step 3). When the return-to-zero signal L does not represent the return-to-zero state, the magnetic north display pulse generating means 44 outputs a return-to-zero pulse G to the driver 45 so that the return-to-zero signal L represents the return-to-zero state, and drives the stepping motor 36 for displaying the magnetic north so as to return the azimuth needle 34 to zero (step 4).

The signal J representing the rotation starting time of the rotor 37a of the stepping motor 37 for displaying time and a direction of the driving current is inputted from the driver 46 into the rotor magnetic field predicting means 42a based on a rotor magnetic field predicting signal I from the time azimuth function control means 41. A rotor rest position (for example, rotor rest position A in FIG. 11) and a rotor rest time are predicted from the signal J. In the case where the rotor rotating angle of the rotor 37a changes with time for one second as shown in FIG. 11, for example, arbitrary time in a range of 0.1 second to 1 second is added to the rotation starting time of the rotor 37a so that the rotor rest time is obtained.

The rest position of the rotor 37a and its time signal K are outputted to the time azimuth function control means 41 (step 5).

At this time, the time azimuth function control means 41 outputs an azimuth sensor exciting signal B to the azimuth meter 50. As a result, the azimuth sensor 50 is excited (step 6), and the azimuth meter 50 starts to measure an azimuth. The detecting means 52 outputs two azimuth data EX and EY, which correspond to output voltages DX and DY in X and Y axial directions in an X–Y plane where the azimuth sensor 51 measures an azimuth, to the magnetic north display pulse generating means 44 (step 7).

The magnetic north display pulse generating means 44 subtracts a signal M of all the offset values X and Y (composed of the rotor leakage magnetic field offset values X1 and Y1 from the stepping motor 37 for displaying time and the stepping motor 36 for displaying the magnetic north, and the peculiar offset values X2 and Y2 owned by the azimuth sensor 51) outputted from the time azimuth function control means 41 from the azimuth data EX and EY corresponding to the two azimuth sensor output voltages DX and DY according to the following equations so as to obtain the corrected azimuth data EX and EY.

$$EX = EX - \text{offset value } X \quad \text{(equation 5)}$$

$$EY = EY - \text{offset value } Y \quad \text{(equation 6)}$$

Here, in the equations 5 and 6, the results of subtracting the offset values X and Y from EX and EY are defined as EX and EY.

Furthermore, the sensitivity ratio (X/Y) is multiplied by EY corresponding to the azimuth sensor output voltage DY according to the following equation so that corrected azimuth data EX and EY are obtained.

$$EX=EX \quad \text{(equation 7)}$$

$$EY=EY \times \text{sensitivity ratio } (X/Y) \quad \text{(equation 8)}$$

Here, in the equations 7 and 8, EX and EY are multiplied by the sensitivity ratio (X/Y), and the results are defined as EX and EY.

Azimuth angle data (θ) is calculated from the corrected two azimuth data EX and EY according to the following equation (step 8).

$$\theta = \arctan(EY/EX) \quad \text{(equation 9)}$$

When the magnetic north display pulse N is derived from the azimuth angle data and the magnetic north display pulse N is outputted to the driver 45, the stepping motor 36 for displaying the magnetic north is driven. The rotor 36a of the stepping motor for displaying the magnetic north 36 makes the azimuth needle 34 display the magnetic north via the train wheel 38 (step 9).

When the azimuth measuring button 10 is again pushed (step 11) within time t (step 10) that the magnetic north display time is previously set, the time azimuth function control means 41 outputs the magnetic needle return-to-zero signal A to the magnetic north display pulse generating means 44, and the magnetic north display pulse generating means 44 outputs the return-to-zero pulse G to the driver 43. As a result, the stepping motor 36 for displaying the magnetic north is driven, and the azimuth needle 34 is returned to zero via the train wheel 4 (step 12).

When the magnetic north display time exceeds t (step 10), the time azimuth function control means 41 outputs the azimuth needle return-to-zero signal A to the magnetic north display pulse generating means 44.

The magnetic north display pulse generating means 44 outputs the return-to-zero pulse G to the driver 45, and the stepping motor 36 for displaying the magnetic north is driven so as to return the azimuth needle 34 to zero via the train wheel 4 (step 12).

The azimuth measurement is ended here (step 13).

According to the above-mentioned azimuth measuring method of the present invention, an azimuth is measured without stopping the second hand in the analog electronic wrist watch with the azimuth meter so that the magnetic north measured by the azimuth needle can be displayed. Since display of time is not disturbed when an azimuth is measured and the magnetic north is displayed, the analog electronic wrist watch with the azimuth meter can be seen and used easily.

The Fourth Embodiment

Figure 5:
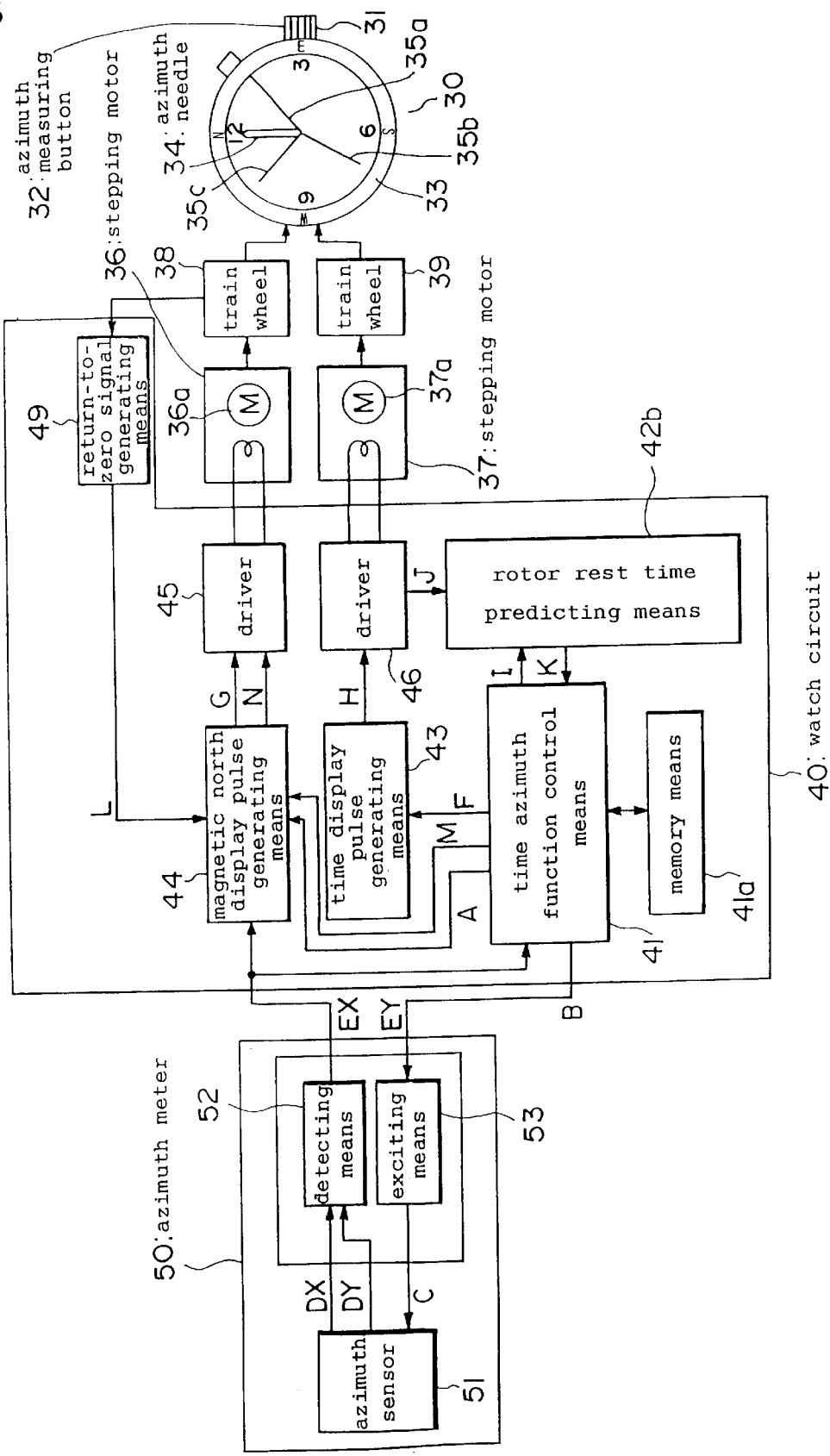
FIG. 5 is a block diagram of an electronic wrist watch according to a fourth embodiment of the present invention.

FIG. 5 is a block diagram of an electronic wrist watch according to a fourth embodiment of the present invention.

In the third embodiment of the present invention shown in FIG. 3, the rotor magnetic field predicting means 42a predicts the rest time and rest position of the rotor 37a based on the signal J outputted from the driver 46 of the watch circuit 40. However, in the present embodiment, a predicting means 42b predicts only rest time of a rotor 37a based on a signal J outputted from a driver 46. Since the other portions are the same as those in the third embodiment, detailed description thereof is omitted.

Figure 6:
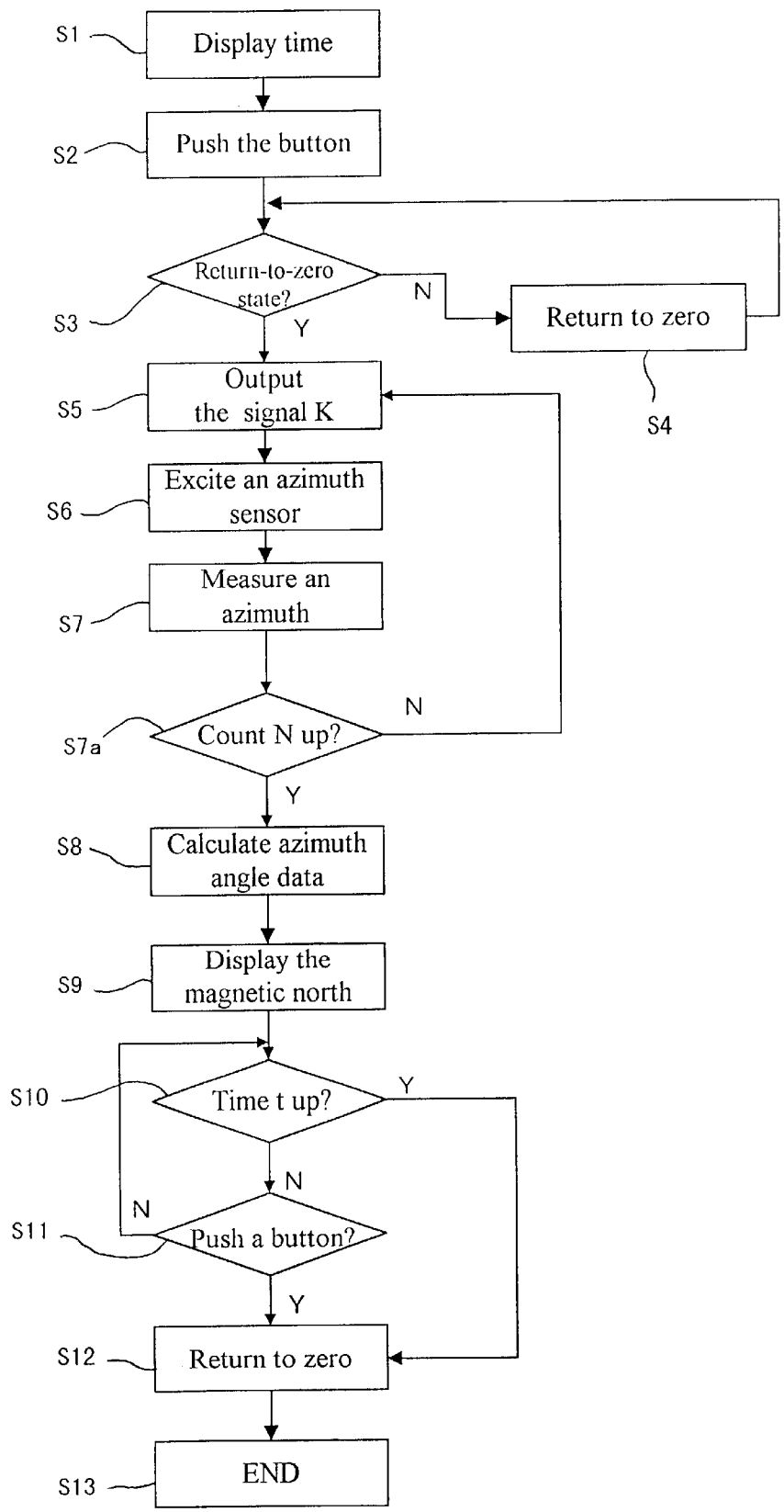
FIG. 6 is a flow chart of azimuth measurement display for explaining the azimuth measurement display method in the electronic wrist watch according to the fourth embodiment.

An azimuth measurement display method in the electronic wrist watch will be described below according to the embodiment shown in FIG. 5 with reference to the flow chart of the azimuth measurement display in FIG. 6.

The description will be given as to only a point in the flow chart of the azimuth measurement display of FIG. 6 different from that in the flow chart of the azimuth measurement display of FIG. 4.

In the fourth embodiment of the present invention, rotor rest time is predicted by the predicting means 42b, but a rotor rest position is not predicted. For this reason, azimuths are measured for respective rotor rest positions until count N shown in FIG. 6 (step 7a). A rotor 36a of a stepping motor 36 for displaying the magnetic north rests in a position where an azimuth needle 34 returns to zero (step 3).

Meanwhile, a stepping motor 37 for displaying time handles a second hand 35a, a minute hand 35b and a hour hand 35c. There exists two rest positions of the rotor 37a of the stepping motor 37 for displaying time as described with reference to FIG. 10. Therefore, in the present embodiment, the count N becomes two. Namely, an azimuth is measured twice at the time that the rotor 37a rests twice while it rotates and rests in two steps.

The azimuth measured azimuths will be described below.

At first, two azimuth data EX and EY corresponding to the two rest positions of the rotor 37a of the stepping motor 37 for displaying time are averaged so that an average of the azimuth data EX and EY is obtained.

Averages of offset values of the azimuth data EX and EY corresponding to the two rest positions of the rotor 37a of the stepping motor 37 for displaying time, namely, an average of the offset value X and an average of the offset value Y, and a ratio of averages of sensitivity, namely, a sensitivity average ratio (X/Y) are stored in a memory means 41a.

As described in the aforementioned equations 5 through 8, the azimuth data EX average and the azimuth data EY average, which are corrected by the offset value X average and the offset values Y average, are obtained.

$$EX \text{ average}=EX \text{ average}-\text{offset value } X \text{ average} \quad \text{(equation 10)}$$

$$EY \text{ average}=EX \text{ average}-\text{offset value } Y \text{ average} \quad \text{(equation 11)}$$

Further, the azimuth data EX average and EY average corrected by the sensitivity average ratio (X/Y) are obtained.

$$EX \text{ average}=EX \text{ average} \quad \text{(equation 12)}$$

$$EY \text{ average}=EY \text{ average } X \text{ sensitivity average ratio} \\ (X/Y) \quad \text{(equation 13)}$$

Azimuth angle data (β) is calculated from the two corrected azimuth data EX and EY averages according to the following equation (step 8).

$$\beta = \arctan(EY \text{ average}/EX \text{ average}) \quad \text{(equation 14)}$$

The steps hereinafter are the same as those in the flow chart of the azimuth measurement display in FIG. 4, and thus the description thereof is omitted.

Here, instead of obtaining the sensitivity average ratio, a sensitivity ratio average may be obtained because this average is approximately equal with the sensitivity average ratio. Therefore, the sensitivity ratio average may be used in the equation 13. As a result, in the case where a plurality of stepping motors exist, for example, it is not necessary to detect or predict directions where the magnetic poles of the stepping motors face, and thus the measured azimuths can be corrected by using single or a small number of correcting values. As a result, this method is advantageous.

The Fifth Embodiment

Figure 7:
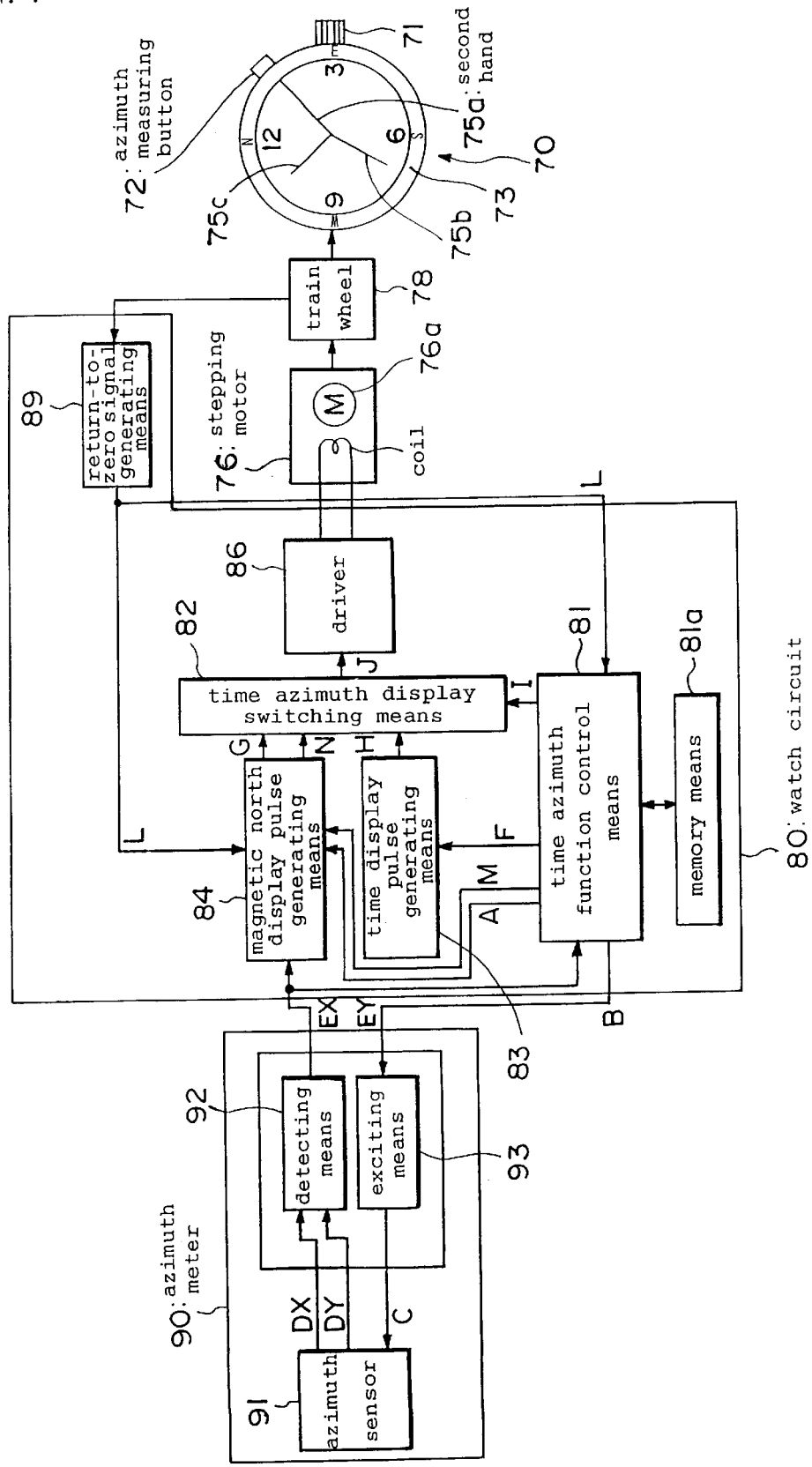
FIG. 7 is a block diagram of an electronic wrist watch according to a fifth embodiment of the present invention.

FIG. 7 is a block diagram of an electronic wrist watch according to a fifth embodiment of the present invention.

As shown in FIG. 7, an analog electronic wrist watch 70 with the azimuth meter includes the azimuth meter 90, a watch circuit (electronic circuit) 80 and a single stepping motor 76 which are used for displaying time and displaying the magnetic north, watch hands which are driven by the stepping motor 76 via a train wheel 78 and are composed of a second hand 75a used as azimuth needles, a minute hand 75b and an hour hand 75c, an azimuth measuring button 72 which is operated when an azimuth is measured, and an azimuth register ring 73.

Here, since the structure of an azimuth meter 90 is the same as that in the third embodiment, the description thereof is omitted.

The watch circuit 80 of the present embodiment is different from the watch circuit 40 in the previous embodiment as is clear from the comparison of FIGS. 3 and 7. Namely, the watch circuit 80 does not have a rotor magnetic field predicting means 42a, and has only a single driver 86 as a driver for driving the stepping motor. However, the watch circuit 80 has time azimuth display switching means 82 for switching connection between magnetic north display pulse generating means 84 and the driver 86 or connection between a time display pulse generating means 83 and the driver 86 according to a signal I from time azimuth function control means 81.

The portion of the watch circuit 80 which is different from the portion of the watch circuit 40 shown in FIG. 3 will be detailed below.

When the time azimuth function control means 81 outputs a switching signal I to the time azimuth display switching means 82, the time azimuth display switching means 82 switches the connection between the time display pulse generating means 83 and the driver 86 into the connection between the magnetic north display pulse generating means 84 and the driver 83. The time azimuth function control means 81 transmits a second hand return-to-zero signal A to the magnetic north display pulse generating means 84, and the driver 83 outputs a driving signal to the stepping motor 76 so as to rotate the second hand 75a. When the second hand 75a comes to the zero position, return-to-zero signal generating means 89 outputs a signal L to the magnetic north display pulse generating means 84 in response to a detecting signal from the train wheel 78 so as to stop the driving of the stepping motor 76. As a result, the second hand 75a returns to zero.

Hereinafter, an azimuth is measured by using the second hand 75a as the azimuth needle, but the excitation of the azimuth needle and the correction are the same as those in the third embodiment.

Figure 8:
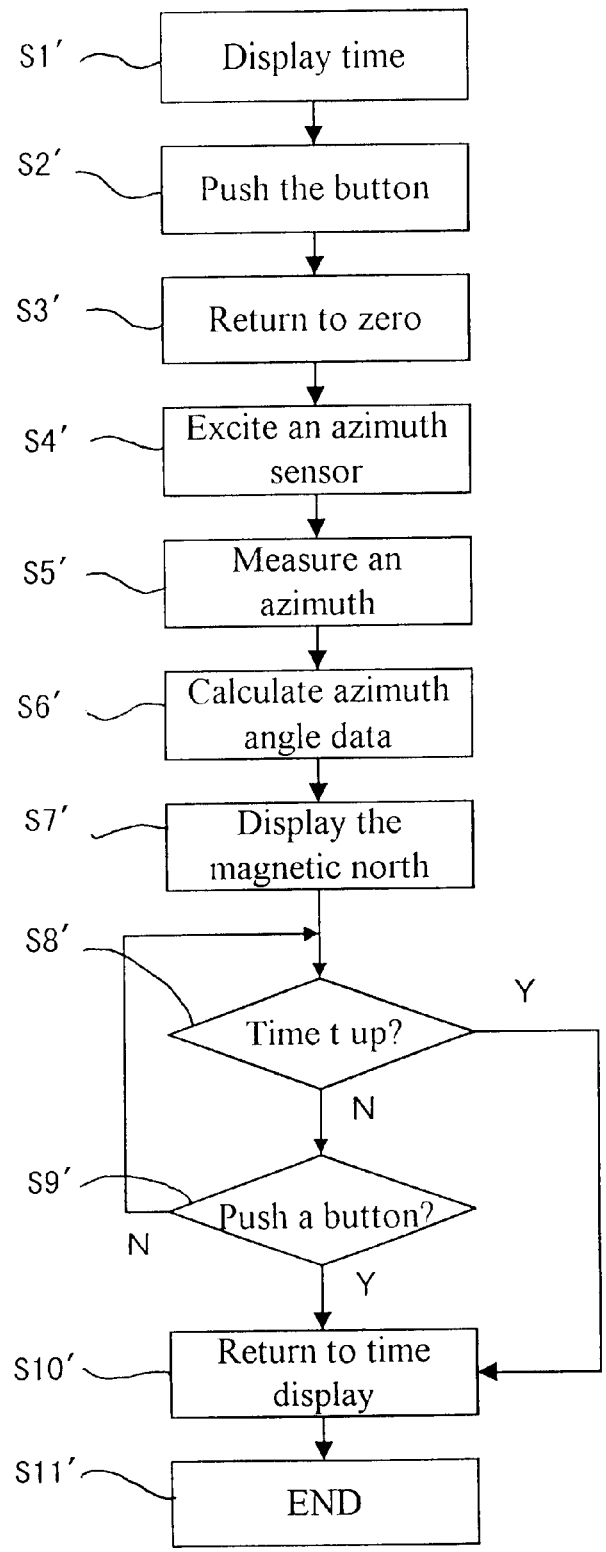
FIG. 8 is a flow chart of the azimuth measurement display for explaining the azimuth measurement display method in the electronic wrist watch according to the embodiment of FIG. 7.

The azimuth measurement display method in the electronic wrist watch will be described below according to the embodiment of FIG. 7 using a flow chart of the azimuth measurement display in FIG. 8.

At first, when the azimuth measuring button 72 is pushed (step 2') in the time display state (step 1') of the analog electronic wrist watch 70 with the azimuth meter, the; azimuth measurement is started.

The connecting state of the driver 83 is switched by the time azimuth display switching means 82, and a rotor 76a of the stepping motor 76 is rotated so that the second hand 75a is returned to zero (step 3').

The time azimuth function control means 81 outputs an azimuth sensor exciting signal B to the azimuth meter 90. A azimuth sensor 91 is excited (step 4'), and the azimuth meter 90 measures the azimuth (step 5'). A detecting means 92 outputs the azimuth data EX and EY to the magnetic north display pulse generating means 84.

The magnetic north display pulse generating means 84 corrects the azimuth data EX and EY based on the offset values and sensitivity ratio stored in memory means 81 a (step 6'). Here, since the procedure of the correction is the same as that in the third embodiment, the description thereof is omitted.

The magnetic north display pulse generating means 84 creates a magnetic north display pulse G based on the corrected azimuth data EX and EY, and it is outputted to the driver 83. As a result, the stepping motor 76 is driven based on the magnetic north display pulse G, and the magnetic north is indicated by the second hand 75a via the train wheel 78 (step 7').

When the azimuth measuring button 72 is pushed again (step 9') within magnetic north display time t (step 8'), the time azimuth function control means 81 outputs a second hand return-to-zero signal A to the magnetic north display pulse generating means 84, and the magnetic north display pulse generating means 84 outputs the return-to-zero pulse G to the driver 86. The stepping motor 76 return the second hand 75a to zero via the train wheel 78. The time azimuth function control means 81 outputs the switching signal I to the time azimuth display switching means 82 based on the return-to-zero signal L from the return-to-zero signal generating means so as to return the magnetic north display to the time display (step 10').

When the magnetic north display time has passed t (step 8'), the time azimuth function control means 81 outputs the secondhand return-to-zero signal A to the magnetic north display pulse generating means 84, and the magnetic north display pulse generating means 84 outputs the return-to-zero pulse G to the driver 86. The stepping motor 76 returns the second hand 75a to zero via the train wheel 78. The time azimuth function control means 81 outputs the switching signal I to the time azimuth display switching means 82 based on the return-to-zero signal L from the return-to-zero signal generating means, and the display is returned from the magnetic north display to the time display (step 10').

Here, the azimuth measurement is ended (step 11').

In the present embodiment, the second hand 75a as the azimuth needle is returned to zero before and after the azimuth measurement display, but if it is not returned to zero, the azimuth display and time display are possible.

The Sixth Embodiment

Figure 9:
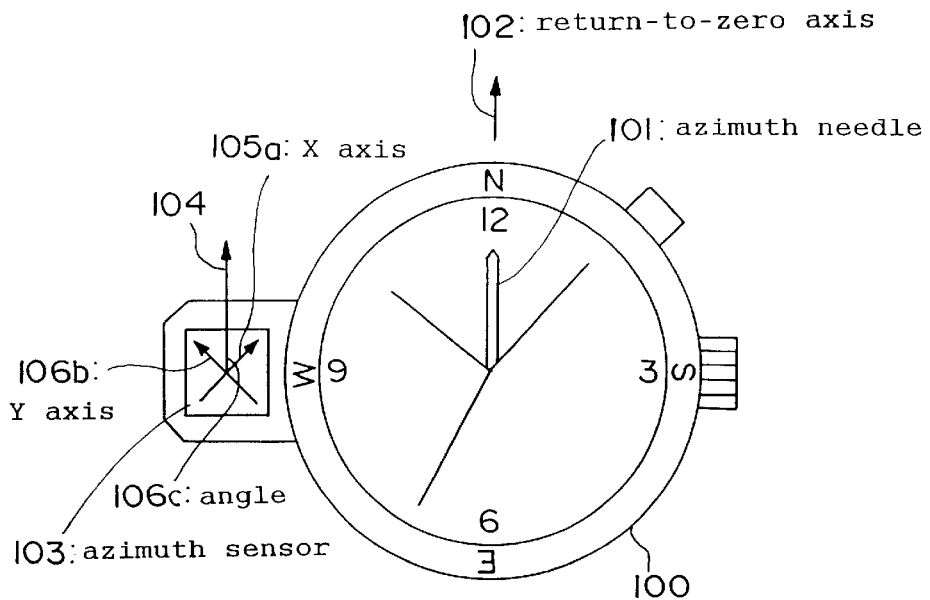
FIG. 9 shows a sixth embodiment of the present invention.

FIG. 9 shows still a sixth embodiment. In this embodiment, an azimuth sensor 103 may be provided in an analog electronic wrist watch 100 with the azimuth meter so that a return-to-zero axis (12 o'clock direction) 102 of an azimuth needle 101 and an X axis of the azimuth sensor 103 form an angle of 106c.

When the magnetic north display pulse generating means 44 (see FIG. 3) corrects the azimuth data EX and EY according to the angle 106c (in this case, the angle 106c is subtracted from an azimuth angle calculated from the azimuth data EX and EY), the return-to-zero axis 102 can be set in the azimuth angle of zero, and thus the azimuth needle 101 can indicate the magnetic north correctly.

According to the above-mentioned embodiment, since the azimuth sensor can be provided in an arbitrary position in the analog electronic wrist watch with the azimuth meter, the providing design of the azimuth sensor in the analog electronic wrist watch with the azimuth meter becomes easy.

The present invention is not limited to the above-mentioned embodiments. The embodiments can be modified variously within the applicable scope of the present invention.

According to the present invention, since the azimuth sensor can be shielded effectively from the magnetic fields which are generated from the magnetized members represented by the battery and the drivers such as a motor by the magnetic screen and the devised provision of the azimuth sensor, an azimuth can be measured accurately by the azimuth sensor.

In addition, since the battery is prevented from being magnetized by the external magnetic field and an influence of the magnetism of the magnetized battery can be suppressed small, the providing position of the battery can be selected comparatively freely, and the circuit substrate is miniaturized sin so that the electronic apparatus with azimuth meter can be miniaturized.

Further, since an influence of the leakage magnetic field generated from the driver such as the stepping motor upon the azimuth detecting output can be corrected, the analog electronic apparatus with the azimuth meter, which can make the accurate measurement even if an azimuth is indicated by the azimuth needle by using the driver and which can be easily seen and used and has excellent azimuth accuracy, can be realized.

INDUSTRIAL APPLICABILITY

The present invention can be widely applied to an electronic apparatus to which an azimuth sensor for detecting an azimuth of the earth magnetism by means of electrical means is provided, and can be applied also to not only an electronic wrist watch and clock but also a radio, a portable television, a portable communication equipment and the like.

What is claimed is:

1. An electronic apparatus, comprising:
   an azimuth meter having an azimuth sensor for electrically detecting an earth magnetism;
   a magnetized member situated at a position to affect the azimuth meter;
   a magnetic screen for blocking off a magnetic field provided around the magnetized member or between the magnetized member and the azimuth sensor, said magnetized member including of a battery and a driver having a rotor composed of a magnet and a coil for driving the rotor, said azimuth sensor measuring ah azimuth when the driver rests;
   time detecting means associated with the for detecting a rotation starting time of the rotor;
   predicting means electrically connected to the time detecting means for predicting a rest time of the rotor from a rotation starting signal detected by the time detecting means; and
   correcting means electrically connected to the predicting means for correcting a measured azimuth according to a predicted result.

2. The electronic apparatus with an azimuth meter according to claim 1, wherein the magnetic screen is provided between the magnetized member and the azimuth sensor and is constituted as a circuit supporting plate for supporting a circuit substrate to which the magnetized member is mounted.

3. The electronic apparatus with an azimuth meter according to claim 1, wherein the magnetic screen is provided on an upper surface or a lower surface of the battery.

4. The electronic apparatus with an azimuth meter according to claim 1, wherein the magnetic screen is formed by a material having high magnetic permeability which prevents the battery from being magnetized by an external magnetism.

5. The electronic apparatus with an azimuth meter according to claim 1, wherein the magnetic screen is provided in contact with the battery.

6. The electronic apparatus with an azimuth meter according to claim 1, wherein the magnetic screen is mounted to a cover detachably provided on a surface of the electronic apparatus with the azimuth meter so that the battery can be inserted or removed.

7. The electronic apparatus with an azimuth meter according to claim 1, wherein the battery is a button type battery.

8. The electronic apparatus with an azimuth meter according to claim 1, wherein the magnetic screen is made of a material having low magnetic permeability, which shields the azimuth sensor from magnetism of the magnet and does not prevent an operation of the driver, and is provided between the driver and the azimuth sensor.

9. The electronic apparatus with an azimuth meter according to claim 1, wherein the azimuth sensor is provided so that a distance between the azimuth sensor and the battery is longer than a distance between the driver, provided closest to the azimuth sensor, and the azimuth sensor.

10. The electronic apparatus with an azimuth meter according to claim 1, wherein the electronic apparatus with the azimuth meter is a watch and has a time hand or a function hand driven by the driver, and is provided with means for returning the time hand or the function hand to a predetermined position.

11. The electronic apparatus with an azimuth meter according to claim 1, wherein the correcting means selects arbitrary rest positions from rotor rest positions of the driver, and obtains offset values and a sensitivity ratio used for correcting a shift between azimuth data of the azimuth sensor and an azimuth of the earth magnetism per selected rest position, and stores the offset values and the sensitivity ratio into memory means, and corrects the measured azimuth obtained by the azimuth sensor by making the measured azimuth have correspondence to the rotor rest positions using the offset values and the sensitivity ratio.

12. The electronic apparatus with an azimuth meter according to claim 1, wherein the electronic apparatus with the azimuth meter has a plurality of drivers, and the correcting means obtains offset values and sensitivity ratio according to combinations of magnetic poles in rest positions of rotors of the drivers, and stores the obtained offset values and the sensitivity ratio into memory means, and corrects the measured azimuth by making the measured azimuth have correspondence to the rotor rest positions using the offset values and the sensitivity ratio.

13. The electronic apparatus with an azimuth meter according to claim 1, wherein the correcting means obtains offset values and sensitivities according to combinations of magnetic poles, and averages the offset values and the sensitivities according to a number of combinations of the magnetic poles, and stores an average value of the offset values and a ratio of the average values of the sensitivities into memory means, and corrects an average value of the measured azimuth in the combinations using the average value of the offset values and the ratio of the average values of the sensitivities.

14. The electronic apparatus with an azimuth meter according to claim 1, wherein offset values and sensitivity ratios are obtained according to combinations of magnetic poles, the offset values and the sensitivity ratios are averaged according to a number of the combinations of the magnetic poles, and an average of the measured azimuths in the combinations is corrected by using average values.

15. The electronic apparatus with an azimuth meter according to claim 1, further comprising arithmetic means, for obtaining a sum or a difference of an azimuth angle measured on a basis of an X axis or Y axis of the azimuth sensor and an angle between the X axis and a return-to-zero axis of an azimuth needle, in order to set a return-to-zero axis of the azimuth needle of the azimuth sensor to an azimuth angle of zero.

16. An azimuth measuring method of an electronic apparatus with an azimuth meter, the electronic apparatus including an azimuth sensor for electrically detecting an earth magnetism, a battery for driving respective drive units and a driver positioned in the drive units having a rotor made of a magnet and a coil for driving the rotor, the method comprising the steps of:

measuring an azimuth by driving the azimuth sensor when the driver rests;

predicting a rest time of the rotor from a rotation starting time of the rotor; and correcting the measured azimuth.

17. The azimuth measuring method of the electronic apparatus with an azimuth meter according to claim 16, wherein offset values and sensitivities are obtained according to combinations of magnetic poles, the offset values and the sensitivities are averaged according to a number of the combinations of the magnetic poles, an average value of the offset values and a ratio of average values of the sensitivities are stored in memory means, and an average of measured azimuths in the combinations is corrected by using the average value of the offset values and the ratio of the average values of the sensitivities stored in the memory means.

18. The azimuth measuring method of the electronic apparatus with an azimuth meter according to claim 16, wherein offset values and sensitivity ratios are obtained according to combinations of magnetic poles, the offset values and the sensitivity ratios are averaged according to a number of the combinations of the magnetic poles, and an average of the measured azimuths in the combinations is corrected by using average values.

19. The azimuth measuring method of the electronic apparatus with an azimuth meter according to claim 16, wherein a sum or difference of an azimuth angle measured on a basis of an X axis and Y axis of the azimuth sensor and an angle between the X axis and a return-to-zero axis of an azimuth needle is obtained by arithmetic in order to set the return-to-zero axis of the azimuth needle of the azimuth sensor to an azimuth angle of zero.

20. The azimuth measuring method of the electronic apparatus with an azimuth meter according to claim 16, wherein the electronic apparatus with the azimuth meter is a watch and has a time hand or a function hand driven by the driver; and the time hand or the function hand is returned to a predetermined position, and the azimuth-measured azimuth by means of the azimuth sensor is corrected.

21. An azimuth measuring method of an electronic apparatus with an azimuth meter, the electronic apparatus including an azimuth sensor for electrically detecting an earth magnetism, a battery for driving respective drive units and a driver positioned in the drive units having a rotor made of a magnet and a coil for driving the rotor, the azimuth measuring method comprising the steps of:

measuring an azimuth by driving the azimuth sensor when the driver rests;

predicting a rest time of the rotor and a direction of a magnetic field generated from the rotor based on a rotation starting time of the rotor and a direction of a driving current flowing through the coil; and correcting the measured azimuth.

22. The azimuth measuring method of the electronic apparatus with an azimuth meter according to claim 21, wherein a determined rest position is selected from positions where the rotor of the driver rests, offset values and sensitivity ratio of the selected rest position are obtained, and the obtained offset values and the sensitivity ratio are stored in memory means, and the measured azimuth is corrected by making the measured azimuth have correspondence to the rest position of the rotor using the offset values and the sensitivity ratio.

23. The azimuth measuring method of the electronic apparatus with an azimuth meter according to claim 21, wherein in case where the electronic apparatus with the azimuth meter has a plurality of drivers, offset values and sensitivity ratios are obtained according to combinations of magnetic poles in rest positions of rotors of the drivers, and the obtained offset values and sensitivity ratios are stored in memory means, and the measured azimuth is corrected by making the measured azimuth have correspondence to the rest positions of the rotors using the offset values and the sensitivity ratios.

24. The azimuth measuring method of the electronic apparatus with an azimuth meter according to claim 21, wherein a sum or difference of an azimuth angle measured on a basis of an X axis and Y axis of the azimuth sensor and an angle between the X axis and a return-to-zero axis of an azimuth needle is obtained by arithmetic in order to set the return-to-zero axis of the azimuth needle of the azimuth sensor to an azimuth angle of zero.

25. The azimuth measuring method of the electronic apparatus with an azimuth meter according to claim 21, wherein the electronic apparatus with the azimuth meter is a watch and has a time hand or a function hand driven by the driver; and the time hand or the function hand is returned to a predetermined position, and the azimuth-measured azimuth by means of the azimuth sensor is corrected.

26. An electronic apparatus, comprising:

an azimuth meter having an azimuth sensor for electrically detecting an earth magnetism;

a magnetized member situated at a portion to affect the azimuth meter;

a magnetic screen or blocking off a magnetic field provided around the magnetized member or between the magnetized member and the azimuth sensor, said magnetized member including a battery and a driver having a rotor composed of a magnet and a coil for driving the rotor, said azimuth sensor measuring an azimuth when the driver rests;

time detecting means associated with the rotor for detecting a rotation starting time of the rotor;

rotor magnetic field predicting means associated with the time detecting means for predicting a rest time of the rotor and a direction of a magnetic field generated from the rotor based on a rotation starting signal detected by the time detecting means and a direction of a driving current flowing through the coil; and correcting means electrically connected to the rotor magnetic field predicting means for correcting a measured azimuth according to a predicted result.

27. The electronic apparatus with an azimuth meter according to claim 26, wherein the correcting means selects arbitrary rest positions from rotor rest positions of the driver, and obtains offset values and a sensitivity ratio used for correcting a shift between azimuth data of the azimuth sensor and an azimuth of the earth magnetism per selected rest position, and stores the offset values and the sensitivity ratio into memory means, and corrects the measured azimuth obtained by the azimuth sensor by making the measured azimuth have correspondence to the rotor rest positions using the offset values and the sensitivity ratio.

28. The electronic apparatus with an azimuth meter according to claim 26, wherein the electronic apparatus with the azimuth meter has a plurality of drivers, and the correcting means obtains offset values and sensitivity ratio according to combinations of magnetic poles in rest positions of rotors of the drivers, and stores the obtained offset values and the sensitivity ratio into memory means, and corrects the measured azimuth by making the measured azimuth have correspondence to the rotor rest positions using the offset values and the sensitivity ratio.

29. The electronic apparatus with an azimuth meter according to claim 26, further comprising arithmetic means, for obtaining a sum or a difference of an azimuth angle measured on a basis of an X axis or Y axis of the azimuth sensor and an angle between the X axis and a return-to-zero axis of an azimuth needle, in order to set a return-to-zero axis of the azimuth needle of the azimuth sensor to an azimuth angle of zero.

30. The electronic apparatus with an azimuth meter according to claim 26, wherein the electronic apparatus with the azimuth meter is a watch, and has a time hand or a function hand driven by the driver, and means for returning the time hand or the function hand to a predetermined position.

* * * * *

UNITED STATES PATENT AND TRADEMARK OFFICE
CERTIFICATE OF CORRECTION

PATENT NO. : 6,385,133 B1  
DATED : May 7, 2002  
INVENTOR(S) : Norio Miyauchi

It is certified that error appears in the above-identified patent and that said Letters Patent is hereby corrected as shown below:

<u>Column 15,</u>  
Line 41, delete "of";  
Line 43, change "ah" to -- an --;  
Line 45, after "the" add -- rotor --; and <u>Column 18,</u>  
Line 45, change "or" to -- for --.

Signed and Sealed this

Second Day of March, 2004

JON W. DUDAS  
*Acting Director of the United States Patent and Trademark Office*